July 29, 1969
N. R. BUCK
3,458,382
LAMINATOR ASSEMBLY
Filed Oct. 24, 1965
2 Sheets-Sheet 1
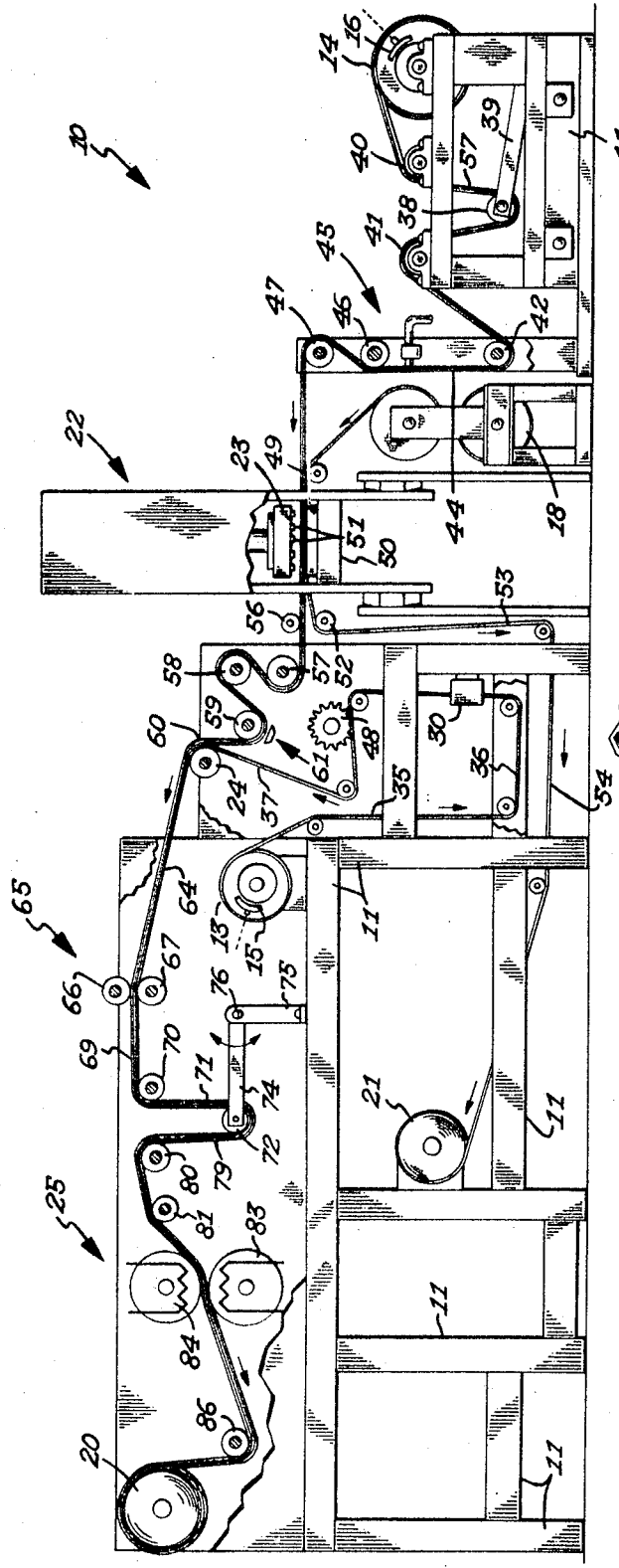
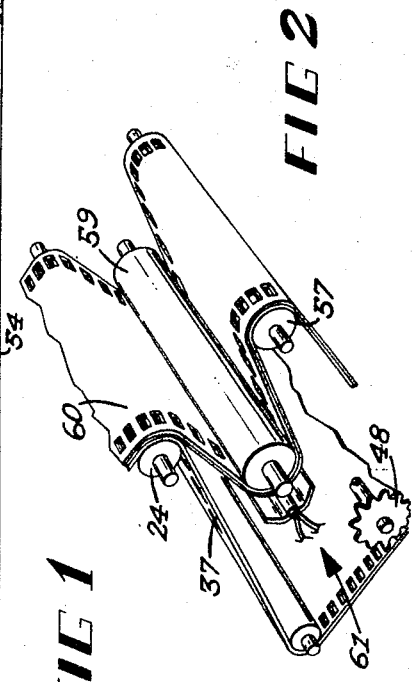
INVENTOR.
NORMAN R. BUCK
BY
Meyers & Peterson
ATTORNEYS July 29, 1969 N. R. BUCK 3,458,382
LAMINATOR ASSEMBLY
Filed Oct. 24, 1965 2 Sheets-Sheet 2

INVENTOR.
NORMAN R. BUCK
BY Meyers & Peterson
ATTORNEYS

3,458,382
LAMINATOR ASSEMBLY
Norman R. Buck, Northfield, Minn., assignor to G. T. Schjeldahl Company, Northfield, Minn., a corporation of Minnesota
Filed Oct. 24, 1965, Ser. No. 504,740
Int. Cl. B32b 31/08
U.S. Cl. 156—543                                                5 Claims

ABSTRACT OF THE DISCLOSURE

A laminator assembly for printed wiring arranged to form a laminate of multiple webs, and including a punching station, a tack roll station, and a sealing station. The apparatus is provided with a draw roll interposed between the tack roll and the sealing roll. The tack roll which is not driven, but idles, carries the individual webs about its periphery for a substantial arcuate distance, and is disposed immediately adjacent a heating station which heats one web while shield means are provided for preventing exposure of the non-heated web to the heater element.

---

The present invention relates generally to an improved laminator assembly, and more specifically to a laminator assembly which provides proper lateral and longitudinal registration between a plurality of webs, and which is adapted to minimize the distortion introduced during production between individual webs or individual layers forming a web.

In the preparation of a laminate assembly, wherein a plurality of webs are utilized to make up the finished laminated product, it is frequently necessary to align the webs both laterally and longitudinally in order to prepare the desired final product. When similar uniform webs are being considered, registration is normally not an exceedingy or exceptionally difficult problem, since the environmental conditions are common for each of the webs, and, hence, the tendency of the individual webs to elongate, shrink, or distort will be equalized. On the other hand, when webs are being laminated from diverse materials, some of which have thermal coefficients of expansion which exceed that of others, and some of which have varying stretch coefficients for given tensile conditions, proper registration of the finished product becomes extremely difficult and cumbersome. Furthermore, where the laminating technique employs a multitude of webs, some of which may have a pre-existing registration pattern thereon, this pattern requiring proper registration with an additional web to be superimposed thereon, registration problems become exceedingly cumbersome and difficult to cope with. Generally, in a laminating assembly, it has been found that a solvent-free bonding agent is preferred, since a more uniform void-free bond can be prepared in this fashion. Therefore, a thermally activated or thermally responsive adhesive is preferred. Unfortunately, if such an adhesive is being utilized, the exposure of the webs involved in the ultimate laminating process to the thermal energy required for the bonding operation can present a problem. For example, in certain particular plastic film structures, such as, for example, stress-oriented polyethyleneterephthalate, dimensional stability fails when exposed to relatively high temperatures occur. This may present a problem when this particular material is placed in contact with a copper laminate structure, such as, for example, a printed-wiring structure, since the copper may absorb substantial quantities of thermal energy when exposed to radiant energy sources. This heated metallic film, for example, copper, when in intimate contact with the thermally unstable plastic substances such as, for example, stress-oriented films of polyethyleneterephthalate, will cause distortions to occur along the plastic film structure. Obviously, if the distortions occur in a plastic film, the registration will accordingly fail and proper registration will no longer be possible.

In accordance with the present invention, an apparatus has been designed which permits the use of thermally responsive or thermally activated adhesive in combination with a previously formed web of a metal-plastic film laminate. The metal may be a strip of highly thermally conductive metal, such as copper or the like, and the plastic film may be a layer or stress-oriented polyethyleneterephthalate, for example. In accordance with the arrangement of the apparatus and process of the present invention, the metal-plastic film laminate webbing is handled in such a way that it is effectively shielded or otherwise held in non-viewing relationship with the source of heat utilized to activate the thermally responsive adhesive until a preliminary tack-bond can be formed between the individual webs. This is accomplished with proper registration being maintained between the individual webs, as is desired. The apparatus of the present invention provides, as indicated, for both longitudinal and lateral registration for the webs.

Another factor of considerable importance is the relative arrangement of the individual webs. If, for example, the web which is fabricated from a metal-plastic film laminate is bonded to a second plastic film, such as, for example, to form a coverlay over the metallic film, it is frequently necessary to provide perforation or other ports in the coverlay web in order to expose certain predetermined portions of the metallic surface therethrough. Thus, for example, in a conventional printed circuit, the copper film may be supported in sandwich relationship between a pair of plastic films, such as, for example, stress-oriented polyethyleneterephthalate films. In order to achieve proper registration between the copper-plastic film laminate web with the coverlay web, means are provided to sense the precise location of a certain pattern indica on the dominate web, this preferably being the metal-plastic web, and, upon sensing the position of this pattern indicia, the apparatus will lie at dwell while a punching or other operation is performed on the coverlay web. During this intermittent functioning of this operation in the apparatus, the final seal may preferably function on a continuous basis. Thus, certain of the webs may enter the apparatus on an intermittent motion basis; however, they may leave on a continuous basis.

In order to gain the advantage of high speed, high volume production, it has been found that a production technique based on a roll-to-roll process will provide the most expeditious treatment of the material. Since it is important that the final operation, that is, the hot-sealing of the coverlay to the metal-plastic laminate, be conducted continuously, means are provided for establishing intermittent motion in one portion of the encapsulator assembly while providing for continuous operation in another portion of the assembly.

Therefore, it is an object of the present invention to provide an improved laminator assembly which is particularly adapted to handle various diverse webs having various diverse physical properties, while preparing an ultimate finished assembly product of unitary form and substantially unitary characteristics.

It is yet a further object of the present invention to provide an improved laminator assembly which is adapted to maintain proper registration between dimensionally unstable webs, these webs being, for example, diverse in their response to various physical conditions, such as, for example, thermal conditions or the like.

It is still a further object of the present invention to provide an improved laminator assembly which is adapted to provide for proper lateral and transverse registration between a pair of webs being joined together, these webs having various and diverse thermal coefficients of expansion.

It is yet a further object of the present invention to provide an improved laminator assembly which is adapted to treat dimensionally unstable webs of varying thermal responsive characteristics to form a single laminate structure therefrom, the technique employing thermally responsive adhesive in forming the bond between the various webs of the laminate structure.

It is yet a further object of the present invention to provide an improved laminator assembly which is adapted to have a continuous output at the bonding station, and an intermittent input to the system, the laminator assembly providing independent draw-roll operation for continuous encapsulation of various diverse webs of material forming the laminate.

It is yet a further object of the present invention to utilize an improved laminator assembly which is arranged to sense the presence of a predetermined indicia on one dominate web, and utilize the position of this dominate web relative to sense or to initiate a punching or other operation on a coverlay or subservient web, the arrangement being such that the subservient is joined to the dominate web at a subsequent time with the subservient web being bonded to the dominate web at a point in a repeat pattern which coincides with the precise pattern for which the subservient web was punched or otherwise treated.

Other and further objects of the present invention will become apparent to those skilled in the art upon a study of the following specification, appended claims, and accompanying drawings wherein:

FIGURE 1 is a side elevational view, partially in section, showing the apparatus of the present invention, and indicating the spans of travel of the materials through the apparatus;

FIGURE 2 is a detail perspective view of the heating and tack-roll portions of the laminator apparatus.

Figure 3:
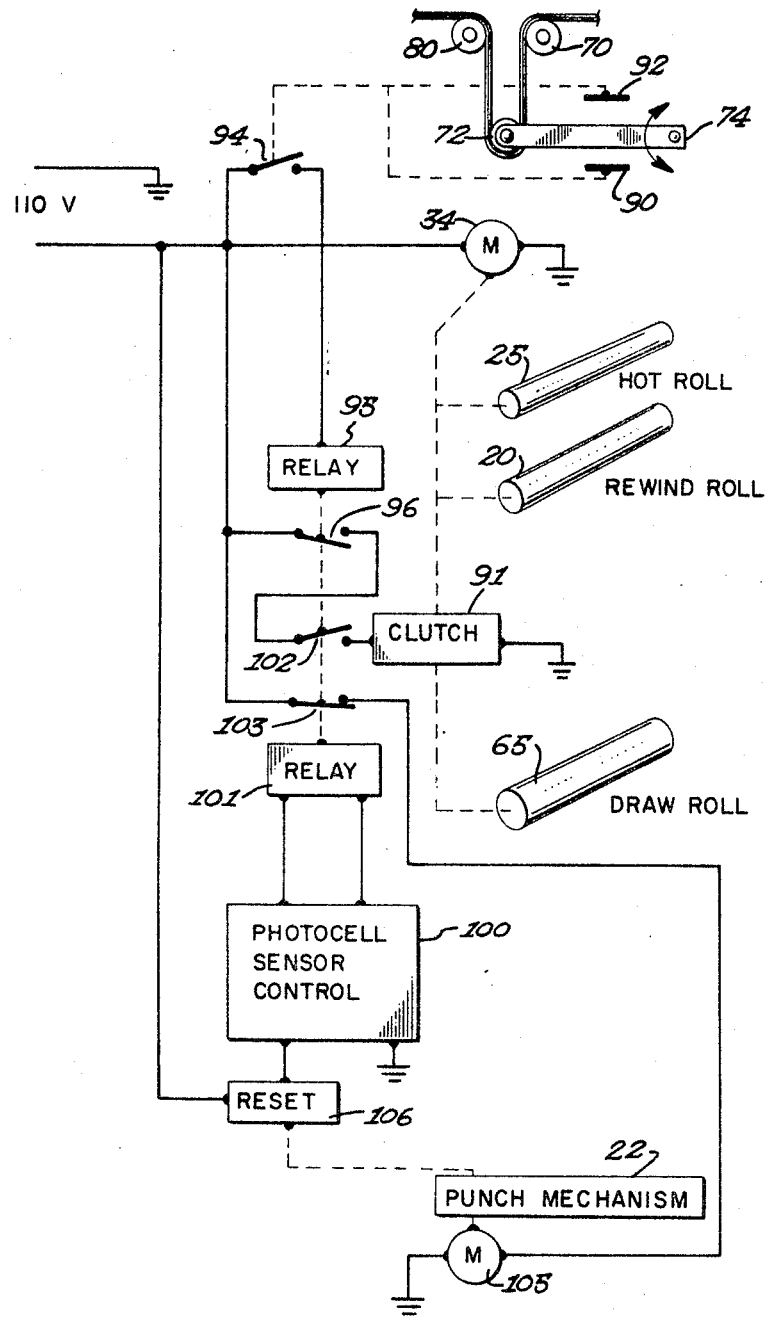
FIGURE 3 is a schematic diagram of a typical circuit which can be utilized to control the operation of the apparatus shown in FIGURES 1 and 2.

In accordance with the preferred modification of the present invention and with particular attention being directed to FIGURES 1 and 2, the laminator assembly generally designated 10 includes a plurality of framing elements 11, the framing elements comprising conventional horizontal rails, vertical struts, and the like, as required for support. The frame is appropriately journaled to receive supply rolls where indicated, the supply rolls including a first supply roll 13 which preferably comprises an etched circuit supply roll of copper stress oriented polyethylene terephthalate laminate. Stress oriented polyethylene terephthalate is available commercially under the trade name "Mylar" from the E. I. duPont de Nemours Corp. of Wilmington, Delaware, this material being stressed oriented during the curing period. A second supply roll 14 is provided, this second supply roll also being mounted in journaled relationship to the framing means 11. In order to maintain precise and predetermined tension along the various spans which extend from the individual supply rolls 13 and 14, brake or drag means as indicated at 15 and 16 respectively are provided. Thus, the tension can be adjusted as is appropriate for the materials being treated, with the tension being maintained at a predetermined magnitude during the entire laminating operation. A third supply roll is provided as at 18 with drag means provided, if desired, this supply roll providing an underlay film of paper to the punching operation to be described later. The paper layer underlies the coverlay material during its passage through the punching station. A rewind roll is provided for the finished laminated material such as is shown at 20, and a rewind roll 21 is provided as a take-up for the paper web. It will be appreciated that both rewind rolls are journaled for rotation within the frame means 11, and are also powered for maintaining a predetermined tension on the individual webs.

Within the laminating assembly, a punching station generally designated 22 is provided for treating the coverlay material, as required, the punching mechanism per se being shown at 23. A tack roll is shown at 24 in order to form or establish an initial bond, of a temporary nature, between the coverlay film and the pre-conditioned laminate from the supply 13. A hot roll station generally designated 25 is provided in order to establish a bond, of a permanent nature between the individual members of the laminate structure. For use with a thermally responsive or thermally activated adhesive member, the hot roll station 25 provides the final heat necessary to perform the ultimate sealing operation.

In order to better appreciate the operation of the laminator assembly, a brief description will be made of the operation before any detailed description is made of the various individual stations throughout the assembly. In this regard, the supply rolls 13 and 14 are each coupled, through their respective individual spans, to the hot roll station 25, and ultimately to the rewind mechanism 20. Throughout the individual operations the preconditioned laminate from the supply roll 13 moves through a position sensing station generally designated 30, and thereafter to the tack roll 24 where it is placed in tack bonding relationship to the coverlay film from the second supply roll 14. This second supply roll 14 provides material which moves through certain individual spans, and ultimately to the punching operation. After the punching station 22, it is properly matched to the pre-conditioned or pre-formed laminate at the tack station 24. After the tacking operation is complete, the material moves through the bonding operation at the hot roll station 25, and thereafter the finished product is taken up on the rewind 20.

Turning now to the pre-conditioned laminate material supplied on the first supply roll 13, this material as previously indicated, preferably comprises a printed circuit element or the like consisting of a metal-plastic film laminate such as, for example, copper-polyethylene terephthalate laminate. The copper may be of any ordinary circuitry thickness, such as, for example, one ounce copper up to about four ounces copper, and the plastic film portion of the laminate may range in thickness from between about one-quarter mil up to about several mils of polyethylene terephthalate. Obviously, for roll-to-roll production, flexibility is required in the products and therefore the material having the lower limit of thickness will be preferred and normally used. The material from the first supply roll 13, such as, for example, copper-polyethylene terephthalate laminate consisting of pre-etched copper and pre-punched polyethylene terephthalate, is taken off of the supply roll 13 under appropriate tension as established by the brake or drag mechanism 15, and moved through a first span area as at 35. The material moves from the span area 35 across a transverse span area 36 and ultimately into viewing relationship with the position sensing station 30. The position sensing station 30 may preferably comprise a photo-electric cell, a pair of sensing fingers or the like in order to determine when the material from the preconditioned roll passing through the sensing station is provided with certain predetermined indicia. This type of sensing operation is generally old in the art, and position sensing stations prepared from photo-electric sensing means or contact fingers are widely commercially available. No particular unusual operation is required, except that the position sensing station be coupled to a suitable relay for interrupting the flow of current to the main drive motor, such as is shown in FIGURE 3 at 34. After passing through the position sensing station, the pre-conditioned material then proceeds to move into contact with the coverlay at the tack roll 24.

Turning now to the coverlay material, such as is shown in the second supply roll 14, this material preferably comprises ordinary polyethylene terephthalate, stress-oriented upon curing, such as Mylar or the like. The thickness or gauge of the material is preferably but not necessarily substantially equal to the plastic film utilized in a pre-conditioned laminate material from the first supply roll 13. As the material leaves the second supply roll 14, it moves across a first vertical span 37 whereupon it reaches a first dancer roll 38. The dancer roll 38 is coupled to a pivotal bar member 39 which bar member may, in certain application, preferably be coupled to a pair of limit switches in order to maintain the tension and length of material constant from the roll 14. As indicated, the dancer roll 38 is disposed between a pair of guide rolls 40 and 41. After leaving the guide roll 41 the material passes a third guide roll 42, and thereafter enters a vertical span area as at 44. While traversing the span 44, the material moves across a lateral sensing mechanism generally designated 45, this lateral sensing station preferably comprising a pair of edge guide sucker hoses. These devices are commercially available and may be utilized to pneumatically sense the disposition of a transversing web and are preferably provided with corrective lateral guide means coupled to the guide rolls 46 and 47 in order to correct and control the lateral position of the coverlay material as it approaches the punch station 22. As the coverlay material approaches the punching station 22 in proper transverse guiding relationship, the material is placed in superimposed relationship with a paper layer from the third supply roll 18. This occurs at the guide roll 49 as indicated, the paper moving beneath the punch pad 50 through the punching station 22. While the material is in a dwell position within the punching station 22, the punching head 23 is caused to move reciprocably downwardly and into operative contact with the webs lying therebeneath. Punches of this type are also commercially available, and form no pertinent portion of invention. Individual punching tools are provided at 51, for example. These punching tools are arranged in pre-determined relationship in connection with the ultimate pattern desired on the finished laminate structure, and in phase and registration with the pre-conditioned laminate from the first supply roll 13. After leaving the punching station 22, the paper base web is carried along the lower guide roll 52, across the vertical span 53, and thereafter across the horizontal span 54 and onto the rewind roll 21. The rewind roll 21 is preferably powered from a suitable source, such as, for example, motor 34. The punched coverlay material, after leaving the punching station 22, passes beneath the guide roll 56, and across the surfaces of the individual guide rolls 57 and 58. At the guide roll 59, the adhesive film applied to the coverlay material is exposed to the infra-red radiation given off from the heating element disposed within the heater means 61. Any suitable heating element may be utilized, such as, for example, those electrical resistance heaters known as Calrods, or other resistive heaters prepared from coils of Nichrome wire or the like. The adhesive film which is disposed along the under surface of the coverlay web is exposed directly to the infra-red radiation derived from the heater station 62, this causing a fusing of the adhesive for a temporary tack bond to be formed at the tack roll 24. Preferably a solvent free polyethylene terphthalate base adhesive is utilizsed. This adhesive being available commercially, such as for example, that adhesive identified as GT–300 available from the G. T. Schjeldahl Company of Northfield, Minn. The individual webs, from the first supply roll 13 and from the second supply roll 14 are joined together along the surface of the tack roll 24. Tack roll 24 is freely journaled for rotation in the frame means, as required. After leaving the tack roll 24, the temporarily bonded material moves across a substantially horizontal span at 64 and thereafter reaches the draw rolls shown at 65. The draw rolls comprise a pair of individual rolls 66 and 67 which are spaced apart a sufficient distance so as to cause adequate draw tension to be developed within the individual spans leading up to the draw roll area 65.

In order to provide an appropriate longitudinal and lateral guide for the pre-conditioned laminate, a pin roll shown at 48 is provided. This pin roll is normally not powered, and is preferably adapted to provide for proper longitudinal and transverse alignment of the web from the pre-conditioned supply 13 before it approaches the span 37 on its way to the tacking station 24. In this regard, the supply from the roll 13 is normally provided with perforations which are both reasonably round in configuration, for longitudinal alignment, and those which are reasonably rectangular in configuration having straight longitudinal sides, to enhance the transverse alignment of the web. Of course, it will be appreciated that alignment can be made by any of the other suitable techniques, such as for example, by the utilization of a pair of etched guide sucker hoses as provided at the alignment station 45.

The draw roll derives its power from the motor 34, however it is provided with a separate clutch mechanism as will be described subsequently. After leaving the draw roll area, the temporarily bonded laminate structure moves across the short horizontal span at 69 and thereafter moves across the guide roll 70 in order to enter the short vertical span shown at 71. The bottom of the short vertical span is occupied by the dancer roll 72, this roll being journaled for rotation within the pivotally mounted generally horizontally disposed carrier arm or bracket 74. The carrier arm or bracket 74 is coupled to the upright post 75 by the pivot pin 76. A pair of limit switches are provided for making contact with the surface of the arm 74 for a purpose as will be later defined in greater detail. After leaving the dancer roll 72 the temporarily bonded or tacked laminate moves upwardly through the short vertical span 79 and across the guide rolls 80 and 81, and thereafter into the area of the hot roll or seal roll station 25. The hot roll station 25 is provided with a pair of heated rollers elements 83 an 84, each of which are preferably driven by the motor source 36, in substantially corresponding relationship to the rewind roll 20. The material passing across the hot roll station 25 will be caused to traverse an adequate arcuate length of the hot roll 84 in order to achieve a substantially sufficiently elevated temperature to cause ultimate fusion of the adhesive films for the bonding operation. For a material such as that certain polyethylene terephthalate webbing which has a film of polyester adhesive thereon, such as is commercially available from the G. T. Schjeldahl Company of Northfield, Minn. under their code designation GT–301, an arcuate contact of about 60 degrees at a hot roll temperature of between 200° F. and 250° F. is sufficient to cause adequate fusion of the adhesive film. Obviously, internally disposed heater such as are shown at 85 within the interior of the roll 84 may be successfully utilized. If necessary, an externally disposed radiant heater may be utilized in order to elevate the surface temperature of the rollers 83 and 84 to the desired degree. If there is a problem with dimensional stability of the laminate being formed, the heating means may be dispensed with in the roll 83, as the material may dictate. For general purposes, however, both rolls 83 and 84 will preferably by provided with a source of heat. After leaving the sealing roll station 25, the finished laminate material then passes across the final guide roll 86 and enters the rewind station at 20. It will be understood that the rolls 83 and 84 which comprise the hot roll station 25 may be driven at a speed which provides a peripheral velocity substantially equal to the linear velocity of the web as it moves therebetween. However, for purposes of normal operation, drive means are not absolutely essential or critical for the hot roll station 25, and the friction of the material moving across the surface of the hot roll may be adequate to rotate these rolls as required. The tension which exists in the spans downstream from the draw roll station 65 is preferably substantially matched in the stations upstream from the draw roll 65. This is best accomplished by a tension sensing means which is coupled to the rewind roll 20.

Because of the ever-changing circumferences of the individual supply rolls 13 and 14, along with the changing circumference of the rewind roll 20, a constant tension adjusting mechanism of the types which are commercially available is preferably provided along with the rewind roll 20. If the material being treated is sufficiently dimensionally stable at the tensile forces encountered, no such elaborate tension means are required for the journaled roll 20.

In order to properly register the patterns required from the first supply roll or pre-conditioned laminate 13 with the punched pattern obtained at the punching station 22, the following techniques are employed. As the material enters the position sensing station at 30, the distance remaining from this station to the tack roll is equal to the distance remaining from the punching station 22 to the tack roll. Thus, the preconditioned laminate forms a dominate laminate structure to which is slaved to the operation of the punching station 22. Because the number of integral patterns existing between the tack roll station 24 and the sensing station 30 is equal to the number of patterns between the tack roll and the punching station 22, the position of the punched pattern at the punching station 22 will be keyed to joining the preconditioned laminate at the proper point. This dominate and subservient web technique is required in order to accomplish proper registration between the individual repeating patterns formed on the roll-to-roll laminate. If this were not provided, as indicated, cumulative errors could effectively diminish or effectively eliminate the required accuracy between the indivdual roll elements. Thus, the dominate web taken from the first supply roll may have various inherent inaccuracies in the disposition of the individual repeating patterns, however this is not reasonably calculated to permit any inaccuracies of misalignment in registration to occur at the tack roll 24 because the punch operation at station 22 is keyed to the position of the first supply roll at the position sensing station 30. Thus, when the particular pattern indicia is sensed at the position sensing station 30, the drive to the draw roll 65 is interrupted temporarily while the punching operation occurs at station 22. With the punching operation in process, the individual webs upstream from the sealing roll remain preferably at dwell. Upon completion of the punching operation the position sensing station is then signaled to reset the circuitry for establishing power to the draw rolls at the draw roll station 65. Thus, with the power applied to these draw rolls, the individual webs from the first supply roll 13 and the second supply roll 14 will start moving again until the next sensing event is experienced at the position sensing station 30. Because of the temperatures encountered at the hot roll sealing station 25, it is critical that this portion of the operation be maintained continuously. Thus, the role of the dancer roll 72 will be apparent. This dancer roll may move pivotally arcuately between predetermined limits as indicated by the double headed arrow adjacent thereto. Limit switches are provided for sensing a lowermost desired position, and an uppermost desired position. Thus, the rewind roll 20 preferably moves at a continuous rate which is somewhat slower than the rate at which the draw roll 65 operates. Thus, the draw roll 65 will oversupply the webbing to the dancer roll 72, until the lower limit switch, such as is shown at 90 in the schematic drawing of FIGURE 3, is struck, this action opening a switch contact which disengages the clutch 91 coupling the motor 34 to the draw roll 65. The rewind roll 20 will continue to function at its predetermined rate of speed, until the dancer roll 72 reaches its uppermost arcuate position as determined by the limit switch 92. This disposition will re-establish a locking of the clutch 21 and will again apply power to the draw roll station 65.

Turning to the circuitry involved, attention is directed to FIGURE 3 wherein the individual limit switches 90 and 92 are shown as being operatively coupled to the dancer roll 72. The limit switches 90 and 92 are mechanically coupled to the switch element shown at 94, this switch providing an interruption of energy to the relay 95. The contacts 96 of the relay 95 are preferably normally open, and are adapted to be closed upon power being available to the relay 95. Thus, when the limit switch 90 is contacted by the arm 74 of the dancer roll 72, the contacts of the switch 94 are opened, this interrupting the flow of current to the coil in the relay 95, and thus opening the contacts 96. When in open position, the clutch 91 is disengaged, and power is interrupted to the draw roll 65. This condition continues to exist until the rewind roll 20 shortens the length of the spans 71 and 79 on opposite sides of the dancer roll 72, and causes mechanical contact to occur between the pivotal arm 74 and the limit switch arm 92. Upon making contact with the limit switch arm at 92, the contacts 94 are again closed, this establishing current to the coil of the relay 95, and thus closing the contacts 96 to the clutch member 91.

While various operations may be utilized in the punch mechanism, a convenient arrangement is illustrated in the schematic of FIGURE 3. Power is supplied to the photo-cell sensor control, which is an indication of the position sensing station 30, as at 100. The photo-cell sensor control 100 operates the relay 101 which is provided with contacts as at 102 and 103 the former being normally open, the latter being normally closed. While power is available to the photo-cell sensor control 100, the relay 101 will be provided with sufficient energy for closing the contacts 102 and opening the contact 103. This provides a circuit path through the contacts 96, and the series contacts 102 to the clutch mechanism 91 controlling the operation of the draw roll 65. Upon sensing the existence of a predetermined pattern event in the photo-cell sensor control area, the coil in the relay 101 will be deprived of electrical energy, thereby opening the normally open contacts 102 and closing the normally closed contacts 103. Upon this occurrence, the clutch 91 disengages the draw roll 65 while power is supplied to the motor 105 of the punch mechanism 22. Upon completion of its punching cycle, the punch mechanism is adapted to actuate a reset device 106 to re-establish the current flow to the relay coil in the relay 101 through the photo-cell sensor control 100. This having been completed, the contacts 102 are closed simultaneously with the opening of the contact 103, this energizing the clutch mechanism 91 and again energizing the draw roll 65. The punch mechanism 22, through its motor 105, must be of the type for completing one cycle per energization event. Motors and punch mechanisms of this type are commercially available and are normally preferably utilized here. Of course, various techniques could be used for the operation of the punch mechanism 22, it merely being important to point out here that a cyclic operation, one cycle per energization event, is preferred.

Turning now to the arrangement of the radiant heating means which are employed for the laminate immediately prior to its passing over the tack roll station 24, particular attention is directed to FIGURE 2 of the drawings. At this point, it will be observed that the radiant energy from heater 62 disposed within the infra-red generating station 61 is in viewing relationship with the adhesive film on the coverlay material from the second supply roll 14. It will further be observed that the span of pre-conditioned laminate 37, approaching the tack roll 24 is arranged in non-viewing relationship to the infra-red heating station 61. In other words, the pre-conditioned laminate is effectively shielded from viewing relationship with the heating means of the heating station 61. Therefore, there is no danger of exposing the pre-conditioned laminate to various extreme thermal conditions prior to its being arranged in physical contact with the fused adhesive film at the tack roll station 24. Further shielding is effected by the arranging of the guide roll 59 along with the span 60 of coverlay material immediately adjacent thereto. Therefore, as the material from the pre-conditioned laminate from the supply roll 13 approaches the tacking station 24 along the span 37, there is no significant exposure of this material along this span to any reasonably intense infra-red or other thermal energy. Therefore, since the pre-conditioned laminate is normally dimensionally unstable under varying thermal conditions, the tacking is achieved before any adverse effect is experienced by this pre-conditioned laminate.

It will, of course, be understood that various changes may be made in the form, details, arrangements and proportions of the parts without departing from the scope of my invention as set forth in the appended claims.

I claim:

1. Apparatus for preparing a multi-layer registered printed wiring laminate from a plurality of sources of individual webs including means to support a first supply web having a film of a thermally responsive and activated adhesive on a surface thereof, means to support a second supply web comprising a thermally sensitive pre-conditioned laminate structure consisting of at least two films, with each film of said pre-conditioned laminate having different thermal coefficients of expansion;
   (a) draw roll means for simultaneously drawing said plurality of webs along a certain predetermined common axis;
   (b) guide means associated with each of said webs for controlling the axial disposition thereof;
   (c) idling tack roll means disposed between said plurality of sources and said draw roll for establishing a bond between the surface of said thermally responsive adhesive and one web of said pre-conditioned laminate, said tack roll means including radiant heating means to activate the adhesive film, and span defining means disposed along the path of said second web for bringing said second web into contact with said tack roll means immediately adjacent to and downstream from said radiant heating means and along a span concealed from said source of heat, said webs being in simultaneous wrapped contact along the surface of said tack roll for a substantial arcuate distance.

2. Apparatus for preparing a multi-layer registered laminate from a plurality of sources of individual webs including means to support a first web having a film of thermally responsive and activated adhesive thereon, means to support a second supply web comprising a thermally sensitive pre-conditioned laminate structure consisting of at least two individual films, with each film of said second web having different thermal coefficients of expansion;
   (a) draw roll means for simultaneously drawing of said plurality of webs along a certain predetermined axis;
   (b) guide means associated with each of said webs for controlling the axial disposition thereof;
   (c) idling tack roll means disposed between said plurality of sources and said draw roll for simultaneously wrapping said webs about the surface thereof for a substantial arcuate distance for establishing a bond between the surface of said thermally responsive adhesive and the surface of one film of said pre-conditioned laminate, heating means for said tack roll means to activate the adhesive film, and span defining means disposed along the path of said second web for bringing said second web into surface-to-surface contact with said tack roll means immediately adjacent to and downstream from said heating means, and along a span concealed from said source of heat; and
   (d) a hot roll seal station disposed downstream from said draw roll.

3. Apparatus for preparing a multi-layer registered printed wiring laminate from a plurality of sources of individual webs including means to support a first supply web having a film of a thermally responsive and activated adhesive thereon, means to support a second supply web comprising a thermally sensitive pre-conditioned laminate structure consisting of at least two individual films, with each film of said pre-conditioned laminate having different thermal coefficients of expansion;
   (a) draw roll means for simultaneously drawing said plurality of webs along a certain predetermined axis:
   (b) guide means associated with each of said webs for controlling the axial disposition thereof;
   (c) idling tack roll means disposed between said plurality of sources and said draw roll for simultaneously wrapping said webs about the surface thereof for a substantial arcuate distance for establishing a surface bond between said thermally responsive adhesive and one film of said pre-conditioned laminate, said tack roll means including radiant heating means to activate the adhesive film, and span defining means disposed along the path of said second web for bringing said second web while heated into contact with said tack roll means immediately adjacent to and downstream from said radiant heating means and along a span concealed from said source of heat;
   (d) a rewind roll journaled for rotation in said apparatus and adapted to run at a certain predetermined rate of speed; and
   (e) a hot roll sealing station disposed between said rewind roll and said draw roll, the arrangement being such that said rewind roll runs at a peripheral linear velocity which is slower than the linear peripheral velocity of said draw roll.

4. The laminating apparatus as defined in claim 6 being particularly characterized in that dwell means are provided for interrupting the operation of said draw roll.

5. The laminating apparatus as defined in claim 1 being particularly characterized in that longitudinal and lateral guide means are disposed along each web path.

References Cited

UNITED STATES PATENTS

| 3,068,135 | 12/1962 | Bower | 156—179 |
| 3,239,396 | 3/1966 | Bohannon | 156—52 |
| 3,318,744 | 5/1967 | Hurley | 156—82 |
| 3,368,932 | 2/1968 | Weill et al. | 156—497 |

FOREIGN PATENTS 556,171   4/1958   Canada.

EARL M. BERGERT, Primary Examiner

M. L. KATZ, Assistant Examiner

U.S. Cl. X.R.

156—583